United States Patent Office 3,458,590
Patented July 29, 1969

3,458,590
PROCESS FOR SUPPLYING HYDROGEN FLUO-
RIDE AND BORON FLUORIDE TO XYLENE-
EXTRACTING APPARATUS
Tamotsu Ueno and Takashi Nakano, Niigata-shi, Japan, assignors to Japan Gas-Chemical Company, Inc., Tokyo, Japan, a corporation of Japan
Filed Oct. 27, 1966, Ser. No. 589,871
Claims priority, application Japan, Nov. 2, 1965, 40/67,179
Int. Cl. C07c *15/08, 7/10*
U.S. Cl. 260—674                                5 Claims

ABSTRACT OF THE DISCLOSURE

The separation of m-xylene from a mixture comprising m-xylene, o-xylene, p-xylene and ethylbenzene is effected in an extraction zone by contacting the mixture in said zone with an extracting agent comprising hydrogen fluoride, boron fluoride and at least a portion of the xylene raffinate recovered from the extraction zone. The mol ratio of xylene to boron fluoride in the extracting agent is between 1.14 and 10.

---

Figure 1:
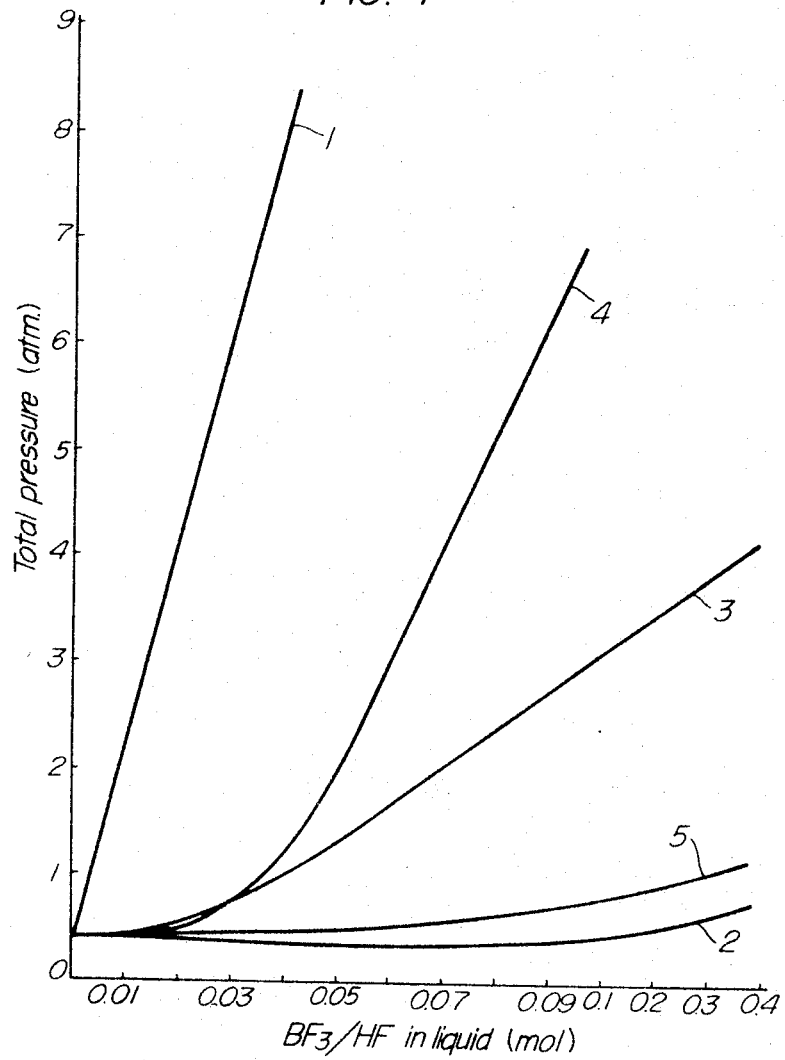

The present invention relates to a process for feeding hydrogen fluoride and boron fluoride to a xylene extractor in a process wherein m-xylene is extracted from a xylene mixture containing ethyl benzene, o-xylene, m-xylene and p-xylene by using hydrogen fluoride and boron fluoride as the extracting agent.

In the xylene mixture containing ethyl benzene, oxylene, m-xylene and p-xylene, the boiling point of each xylene isomer is very close to each other and, especially, the difference in the boiling point between m-xylene and p-xylene is 0.75° C. It is therefore difficult to separate each xylene isomer in high purity from this xylene mixture by distillation. It is especially difficult to separate m-xylene and p-xylene in high purity. For overcoming the said difficulty, a process for extracting and separating m-xylene from a xylene mixture by using hydrogen fluoride and boron fluoride has been published in Japanese patent publication No. 1,583/53. The said official report has, however, not made clear the binding condition of xylene isomers with hydrogen fluoride and boron fluoride and the quantitative relations thereof. It has simply been considered that, when a xylene isomer is subjected to interaction with boron fluoride and is dissolved in hydrogen fluoride, the mol ratio of the xylene isomer to boron fluoride is 1:1. But, as long as boron fluoride is fed in the said ratio, it is impossible to prepare high-purity m-xylene in high yield from the xylene mixture. The present inventors have found that, when the temperature is given, the mol ratio of m-xylene/boron fluoride in the extract solution of hydrogen fluoride is strictly determined by the mol ratio of boron fluoride/hydrogen fluoride in the extract solution of hydrogen fluoride and by the concentration of xylene in the hydrocarbon phase. By utilizing the said correlation, it has become possible to continuously extract high-purity m-xylene in high yield from the xylene mixture.

For extracting m-xylene from the xylene mixture by using hydrogen fluoride and boron fluoride, a tower is used as the xylene extractor and an aliphatic hydrocarbon is selected as the diluent to be added for improving the selectivity of extraction. The starting material, a xylene mixture, is fed into the middle of the tower, hydrogen fluoride and boron fluoride are fed to the tower top, and reflux m-xylene and a diluent are fed to the tower bottom. Counter current extraction is continuously carried out at a temperature between —20° C. and +30° C. In the form of xylene-hydrogen fluoride-boron fluoride complex, m-xylene is extracted from the xylene mixture into the extract solution. The extract solution is taken out from the tower bottom and the residue of m-xylene removal, the raffinate solution of xylene extraction (containing the diluent) from the tower top. When a heavy liquid such as carbon tetrachloride is selected as the diluent, reflux m-xylene and the diluent are fed and the extract solution is taken out reversely from the tower top, while hydrogen fluoride and boron fluoride are fed to, and the residual solution of xylene extraction is taken out from the tower bottom. The extract solution is introduced into a decomposer and is heated, to decompose the said complex. Thereafter, m-xylene is obtained by removing hydrogen fluoride and boron fluoride.

The relation between the mol ratio of boron fluoride/hydrogen fluoride in the complex solution and the vapor pressure of the system is explained below. The xylene-hydrogen fluoride-boron fluoride complex is formed from a xylene isomer with hydrogen fluoride and boron fluoride and is dissolved in the liquid hydrogen fluoride phase, according to the following reaction.

$$X + (HF + BF_3) \text{ liq.} = XH^+ \text{ (in HF)} + BF_4^- \text{ (in HF)}$$

wherein X is a xylene isomer. m-Xylene with especially high basicity shows the strongest reactivity among xylene isomers. The heat of reaction thereof is 5.9 kcal./mole. The relation between the concentration of boron fluoride dissolved in the liquid hydrogen fluoride in the absence of aromatics and the equilibrium partial pressure thereof in gas phase almost follows the Henry's law. When hydrocarbons such as xylene are present in the said system, the partial pressure of boron fluoride is always lowered in comparison with the hydrogen fluoride-boron fluoride system, because of the complex formation according to the said reaction.

An experimental result on the relations between the vapor pressure of these systems and the mol ratio of boron fluoride/hydrogen fluoride is explained by quoting the annexed diagram.

FIG. 1 illustrates the relations between the mol ratio of boron fluoride/hydrogen fluoride and the vapor pressure of the system, obtained from measurement at 0° C. In FIG. 1, while curve 1 is the relation between the mol ratio and the equilibrium pressure of the hydrogen fluoride-boron fluoride system and follows the Henry's law, curves 2, 3, 4 and 5 indicate the vapor pressures of the xylene-hydrogen fluoride-boron fluoride system, which are much lower as compared with the hydrogen fluoride-boron fluoride system. Curve 2 indicates the case that the mol ration of m-xylene/hydrogen fluoride is 0.41, and the lowering of vapor pressure due to the formation of the complex is the largest. Curve 3 indicates the case that the mol ratio of o-xylene/hydrogen fluoride is 0.178, while curve 4 is for the case that the mol ration of ethyl benzene/hydrogen fluoride is 0.07. From the comparison of these cases, it is made clear that the lowering of partial pressure of boron fluoride is increased by increasing the basicity of a xylene isomer constituting the complex. When an aliphatic hydrocarbon is present as the diluent with the xylene isomer, the diluent is hardly dissolved in the hydrogen fluoride phase and dilutes the residual xylene in the hydrocarbon phase. In comparison with the case that the diluting agent is absent, the vapor pressure of the system is increased by the presence of the diluent. Curve 5 indicates the relation in the case that the system indicated by curve 2 is added with n-hexane as the diluent and the mol ratio of xylene/diluent + xylene is 0.5.

As clearly explained above, when a xylene mixture containing various isomers forms the complex thereof with hydrogen fluoride-boron fluoride, the vapor pressure of the system is increased by decreasing the concentration of m-xylene in the xylene mixture. When m-xylene is continuously extracted from the xylene mixture with an extractor by using hydrogen-fluoride-boron fluoride, if it is isothermal in the system, the vapor pressure of the extract solution is the lowest in the portion of high m-xylene concentration while it is the highest in the portion of low m-xylene concentration. Therefore, as long as the operational pressure for the xylene extractor is higher than the highest vapor pressure of the extract solution, the whole of the system is kept in the liquid phase.

The present inventors have also found that such a relation as is observed for m-xylene concerning the mol ratio of m-xylene/boron fluoride in the hydrogen fluophase is present for other xylene isomers. When the residual solution of xylene extraction consisting of o-xylene, p-xylene and ethyl benzene forms the complex thereof with hydrogen fluoride and boron fluoride, the mol ratio of boron fluoride/total xylene in the complex solution is governed by temperature, the mol ratio of boron fluoride/ hydrogen fluoride, the molar fraction of xylenes in the hydrocarbon phase which are present in equilibrium with the complex phase, and the like. In general, however, the solubility is much smaller as compared with the case of m-xylene, that is, the mol ratio of xylene/boron fluoride is approximately in the range of 0.3–1.0.

According to the present invention, a mixer attached to a cooler is provided in addition to the xylene extractor, into which hydrogen fluoride and boron fluoride are fed, the whole or most part of boron fluoride is directly blown in the gas form into the mixer, without being previously dissolved in hydrogen fluoride, and is immediately subjected to mixing and dissolution. The whole or a part of the raffinate drawn out from the extractor along with hydrogen fluoride and boron fluoride is fed into the mixer attached by a cooler to form complex solution, and the whole or a part of said mixed solution is directly returned to the xylene extractor or the entrance of the mixer, or the said mixed solution is fed into a separator and the whole or a part of the separated raffinate xylene solution of xylene is fed together with the complex, the solution of hydrogen fluoride into the xylene extractor. If the mol ratio of xylene/boron fluoride is not more than 0.3–1.0, the vapor pressure of the system increases unnecessarily as described above, the amount of the raffinate xylene solution fed into the said mixer is preferably given so that the amount of xylene in the raffinate xylene solution is 1.14 to 10 times that of charged boron fluoride on molal basis. The temperature of the mixer is −30° C.−+20° C., preferably −15° C.−+5° C. The more the amount of the raffinate xylene solution passing through the mixer, the more preferable for removing the generated heat in the mixer. But, if it is excessive, the load of the pump and other equipments is needlessly increased. The mol ratio of boron fluoride/hydrogen fluoride is preferably 0.02–0.12. It is desirable to feed a part or the whole of boron fluoride in the gas form. The number of the mixer is not necessarily limited to be one, but may be plural. As the type of the mixer, one simply having an agitator or another having the combination of a gas-liquid contactor such as a nozzle mixer or the like attached with heat exchanger may be available.

The following merits are obtained by the performance of the present invention.

In a case that the hydrogen fluoride-boron fluoride mixture solution dissolving the required amount of boron fluoride is directly fed into the extractor, the delivery pressure of the boron fluoride compressor is necessarily increased because of the high vapor pressure of boron fluoride in the mixture solution, to be far above the minimum pressure required for keeping the whole of the said extracting system in the liquid phase. If the mol ratio of boron fluoride/hydrogen fluoride in the extracting agent is lowered for decreasing the delivery pressure of the boron fluoride compressor, it is disadvantageous that the required amount of hydrogen fluoride for the unit amount of xylene to be treated is increased, the extractor is unnecessarily enlarged, and amount of hydrogen fluoride in the extract solution to be treated in the decomposer is increased. In the case that hydrogen fluoride-boron fluoride premixed solution is used as the solvent, the delivery pressure of the compressor can be decreased by the broad lowering of temperature in the portion of the apparatus between the hydrogen fluoride-boron fluoride solvent mixture make-up system and the xylene-solvent mixing system. In this case, it is uneconomical that the employment of considerably low temperature cooling medium is necessary.

By rapidly mixing boron fluoride with the raffinate xylene solution in the mixer attached to the cooler according to the present invention, boron fluoride immediately forms the complex with hydrogen fluoride and the raffinate xylene, so the delivery pressure of the boron fluoride compressor needs to be only slightly higher than the said minimum pressure. As the delivery pressure of the boron fluoride compressor may be relatively low, it is very advantageous from the viewpoint of type selection for the compressor of strong corrosive gas, boron fluoride, required property of metal material for the essential part thereof, leakage protection, saving of power consumption and the like. Further, by providing the mixer attached to the cooler separately, it is possible to protect the degradation of flow condition and the lowering of plate efficiency in the xylene extractor which are caused by installing an agitator and a cooler in the narrow space of the tower interior near the tower top of the xylene extractor and to exhibit the full capacity of the extractor. Therefore, the dissolution of boron fluoride and the cooling of said mixture solution can be made so much easier and more perfect that the disproportionation reaction can perfectly be suppressed and the feed rate of the starting material, xylene mixture, hydrogen fluoride and boron fluoride into the extractor can be increased, enlarging the capacity of the apparatus.

Figure 2:
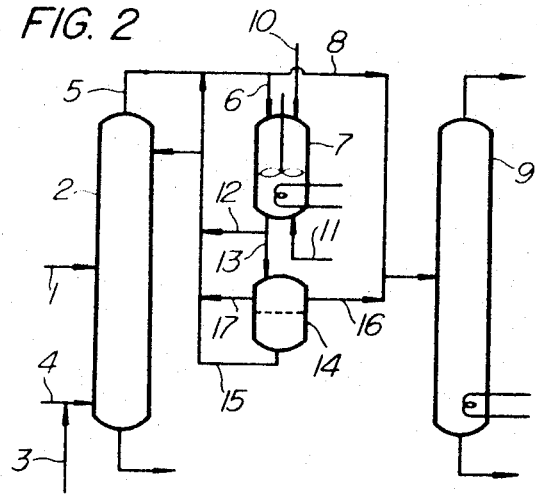

The step of the process according to the present invention is explained with reference to the annexed diagram. One example is shown in FIG. 2. After being dried, the starting material, xylene mixture, is fed through a tube 1 into the middle of the xylene extractor 2. The reflux m-xylene is fed through a tube 3 and the diluent is fed through a tube 3 into the lower part of the xylene extractor 2. The solution of raffinate xylene and the diluent is taken out through a tube 5 from the tower top of the extractor and the whole or a part of said raffinate solution is fed through a tube 6 into a mixer 7. A part of the residual solution of extraction may directly be supplied through a tube 8 into a decomposer 9. Liquid hydrogen fluoride from a tube 10 and boron fluoride gas from a tube 11 are respectively introduced into the mixer 7 having an agitator and a cooler and form the complex with the xylene in the raffinate. The mixture therefrom is directly returned through a tube 12 to the extractor 2 or the entrance of the mixer 7, or is fed through a tube 13 into a separator 14. The separated hydrogen fluoride solution is taken out from the bottom of the separator 14 and, passing through a tube 15, is poured into the tower top of the xylene extractor 2. A supernatant liquid layer obtained in the said separation is the output raffinate xylene and a part thereof is fed through a tube 16 into the decomposer tower 9, the rest being returned through a tube 17 to the extractor.

Figure 3:
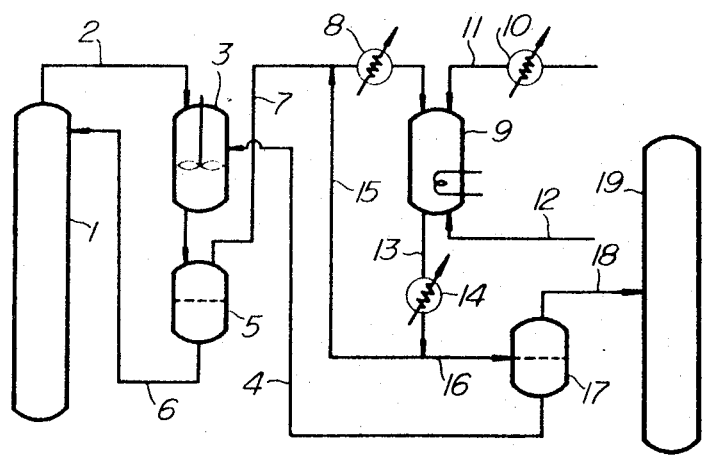

Another example is illustrated in FIG. 3. The solution of raffinate xylene and the diluent obtained in a xylene extractor 1 pass through a tube 2 and is poured into a mixer 3. Thereto, the complex solution is poured through a tube 4. After being subjected to matter exchange, the mixture is conducted into a separator 5, wherein the complex is taken out from a tube 6, the hydrocarbon layer being taken out from a tube 7. The said hydrocarbon layer being precooled by a cooler 8 is fed into a mixer 9. Liquid hydrogen fluoride being precooled by a cooler 10 is fed through a tube 11 into the mixer 9 while compressed boron fluoride is fed through a tube 12. In the mixer, those are in contact with xylenes, to form the complex which is dissolved in the hydrogen fluoride. The obtained mixture is taken out from a tube 13, the heat of complex formation is removed by a cooler 14, and a part thereof is circulated by a tube 15, the rest being fed through a tube 16 into a separator 17. From the upper layer of the separator 17, a xylene layer output raffinate is taken out and is fed through a tube 18 into the decomposer 19. From the bottom of the separator, the hydrogen fluoride liquid complex solution is taken out through the tube 4 and is returned to the mixer 3.

carried out, the material balances and the composition of xylenes in the major streams were as follows.

TABLE 1.—MATERIAL BALANCE IN THE SYSTEM
[Unit: kg./hr.]

| | Stream number | Xylenes | Hexane | Hydrogen fluoride | Boron fluoride |
|---|---|---|---|---|---|
| Feed rate | ② | 1.85 | 0.7 | | |
| | ⑪ | | | 3.2 | |
| | ⑫ | | | | 1.0 |
| Total | | 1.85 | 0.7 | 3.2 | 1.0 |
| Output rate | ⑥ | 0.85 | | 3.2 | 1.0 |
| | ⑨ | 1.00 | 0.7 | | |
| Total | | 1.85 | 0.7 | 3.2 | 1.0 |
| Flow rate of other streams | ⑦ | 1.79 | 0.7 | | |
| | ⑮ | 3.58 | 1.4 | 6.4 | 2.0 |
| | ⑯ | 1.79 | 0.7 | 3.2 | 1.0 |
| | ④ | 0.79 | | 3.2 | 1.0 |

TABLE 2.—COMPOSITION OF XYLENES
[Each mol percent]

| Stream number | Ethyl benzene | p-Xylene | m-Xylene | o-Xylene |
|---|---|---|---|---|
| ② | 22.3 | 38.5 | 1.1 | 38.1 |
| ⑱ | 22.5 | 38.8 | 0.2 | 38.5 |
| ⑥ | 22.1 | 38.2 | 2.1 | 37.6 |

When the outlet temperature of the mixer 9 was kept at 0° C. during the operation, the pressure of the mixer was 3.8 kg./cm.$^2$ and the initial pressure of boron fluoride 4.0 kg./cm.$^2$.

EXAMPLE 3

Using the same apparatus as in Example 2, another run was carried out. The material balance and the composition of xylenes in the major streams were as follows.

EXAMPLE 1

In FIG. 2, the mixer used was a stainless steel autoclave of 1 l. inner volume equipped with an agitator and a cooling jacket. Into a point at a side thereof, 1 kg./hr. of the xylene mixture (ethyl benzene 22.1%, p-xylene 38.0%, m-xylene 4.0% and o-xylene 35.6%) and 2.6 kg./hr. of liquid hydrogen fluoride and, at the same time, 0.38 kg./hr. of boron fluoride gas into the bottom thereof are continuously fed under feeding pressure of 6.0 kg./cm.$^2$. With keeping the amount of the solution to constantly be 500 ml. in the mixer, the hydrogen fluoride phase dissolving the xylene and boron fluoride and the raffinate xylene phase were taken out from the other side of the mixer. In this case, the rotating speed of the agitator was 1000 r.p.m., the temperature of the mixture solution kept at 0° C., the mol ratio of boron fluoride/hydrogen fluoride in the mixture solution being 0.05 and the pressure of the mixer being 4.2 atm.

EXAMPLE 2

When the step of the process as shown in FIG. 3 was

TABLE 3.—INCOME AND EXPENDITURE OF MATERIALS IN THE SYSTEM
[Unit: kg./hr.]

| | Stream number | Xylenes | Hexane | Hydrogen fluoride | Boron fluoride |
|---|---|---|---|---|---|
| Feed rate | ② | 1.27 | 0.3 | | |
| | ⑪ | | | 2.6 | |
| | ⑫ | | | | 0.44 |
| Total | | 1.27 | 0.3 | 2.6 | 0.44 |
| Output rate | ⑥ | 0.62 | | 2.6 | 0.44 |
| | ⑱ | 0.65 | 0.3 | | |
| Total | | 1.27 | 0.3 | 2.6 | 0.44 |
| Flow rate of other streams | ⑦ | 1.13 | 0.3 | | |
| | ⑮ | 2.26 | 0.6 | 5.2 | 0.88 |
| | ⑯ | 1.13 | 0.3 | 2.6 | 0.44 |
| | ④ | 0.48 | | 2.6 | 0.44 |

TABLE 4.—COMPOSITION OF XYLENES
[Each mol percent]

| Stream number | Ethyl benzene | p-Xylene | m-Xylene | o-Xylene |
|---|---|---|---|---|
| ② | 18.0 | 41.2 | 2.0 | 38.8 |
| ⑱ | 18.4 | 41.9 | 0.2 | 39.5 |
| ⑥ | 17.6 | 40.5 | 3.9 | 38.0 |

When the outlet temperature of the mixer 9 was kept at 0° C. during the operation, the pressure of the mixer was 2.5 kg./cm.$^2$ and the initial pressure of boron fluoride was 2.8 kg./cm.$^2$.

Reference Example 1

The same apparatus and feed rates as in Example 2 was employed for the operation and, when the circulating rate of the mixer through the tube 15 was made zero, the outlet temperature of the mixer was +20° C., the pressure of the mixer being 7.5 kg./cm.² and the feeding pressure of boron fluoride being 8 kg./cm.².

Reference Example 2

The same feed rate as in Example 2 was employed for the operation and, after being previously dissolved in hydrogen fluoride at 0° C. in another mixer, boron fluoride was fed through the tube 11. The pressure of the hydrogen fluoride and boron fluoride mixer was 18 kg./cm.², the initial pressure of boron fluoride being 18.5 kg./cm.².

What is claimed is:

1. A process for feeding hydrogen fluoride and boron fluoride into a xylene extractor, characterized in that, in a process for extracting m-xylene from a xylene mixture containing ethyl benzene, o-xylene, m-xylene and p-xylene by using hydrogen fluoride and boron fluoride as the extracting agent, hydrogen fluoride, boron fluoride and the whole or a part of the raffinate xylene solution taken out from the said xylene extractor are mixed together under cooling, where the amount of the raffinate xylene solution is kept so that the amount of xylene in the raffinate xylene solution is 1.14 to 10 times in mol that of the said charged boron fluoride, and the whole or a part of the said mixture is fed to the said xylene extractor.

2. A process, according to claim 1, wherein the mol ratio of boron fluoride/hydrogen fluoride is between 0.02 and 0.12.

3. A process, according to claim 1, wherein the temperature of the said mixture is between −30° C. and +20° C.

4. A process, according to claim 1, wherein the temperature of the said mixture is between −15° C. and +5° C.

5. A process, according to claim 1, wherein the said mixer is equipped with an agitator and a cooler.

References Cited

UNITED STATES PATENTS 2,738,372  3/1956  Talbot.

DELBERT E. GANTZ, Primary Examiner

CURTIS R. DAVIS, Assistant Examiner

U.S. Cl. X.R.

208—336